(12) United States Patent
Ran et al.

(10) Patent No.: US 11,417,136 B2
(45) Date of Patent: Aug. 16, 2022

(54) CAPTURING AND QUANTIFYING BODY POSTURES

(71) Applicant: International Business Machines Corporation, Armonk, NY (US)

(72) Inventors: Chuan Ran, Morrisville, NC (US); Junhui Wang, Cary, NC (US); Guandong Zhu, Raleigh, NC (US); Yongchang Cui, Cary, NC (US); Shuyan Lu, Cary, NC (US); Pu Yang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/038,568

(22) Filed: Sep. 30, 2020

(65) Prior Publication Data

US 2022/0100992 A1 Mar. 31, 2022

(51) Int. Cl.
*G06V 40/10* (2022.01)
*A63B 69/38* (2006.01)

(52) U.S. Cl.
CPC ............ *G06V 40/103* (2022.01); *A63B 69/38* (2013.01); *G06V 40/113* (2022.01)

(58) Field of Classification Search
CPC .... G06V 40/103; G06V 40/113; G06V 40/23; G06V 10/80; G06V 20/20; G06V 40/20; G06V 10/17; A63B 69/38; A63B 2220/833; A63B 69/3685; A63B 2225/50; A63B 2220/40; A63B 69/3632; A63B 71/0622;
(Continued)

(56) References Cited

U.S. PATENT DOCUMENTS 6,126,449 A * 10/2000 Burns .................... A63B 69/00
473/131
8,025,560 B2 9/2011 Ikejiri
(Continued)

FOREIGN PATENT DOCUMENTS

CN 101964047 A 2/2011
CN 203458774 U 3/2014
(Continued)

OTHER PUBLICATIONS

"A type of visual anthropomorphic table tennis ball machine", An IP.com Prior Art Database Technical Disclosure, Disclosed Anonymously, IP.com No. IPCOM000254409D, IP.com Electronic Publication Date: Jun. 26, 2018, 4 pages.
(Continued)

*Primary Examiner* — Nimesh Patel
(74) *Attorney, Agent, or Firm* — David B. Woycechowsky

(57) ABSTRACT

Disclosed are techniques for quantifying body postures of a player employing a loop drive technique to strike a ball, such as performed in table tennis activities. A video recording of a player striking a ball with a loop drive technique is received and divided, using image processing techniques, into two segments: the first concerning player body postures before the ball is hit, and the second concerning body postures from the moment of impact between the ball and racket and the subsequent follow-through body postures. Then, image processing techniques are again leveraged to isolate and quantify specific body postures contributing to a loop drive technique in a given segment.

3 Claims, 5 Drawing Sheets

(58) Field of Classification Search
CPC ........ A63B 2071/0647; A63B 2220/13; A63B 2220/30; A63B 24/0062; A63B 2220/16; A63B 2071/065; A63B 2220/00; A63B 2024/0068; A63B 2220/53; A63B 2024/0056; A63B 2071/0694; A63B 2220/62; A63B 2220/807; A63B 2220/836; A63B 69/26; A63B 2220/20; A63B 2214/00; A63B 2220/05; A63B 2220/10; A63B 2220/17; A63B 2220/44; A63B 2220/54; A63B 2220/80

See application file for complete search history.

(56) References Cited

U.S. PATENT DOCUMENTS

| | | | |
|---|---|---|---|
| 8,251,789 | B2 | 8/2012 | Ikejiri |
| 10,112,076 | B2 | 10/2018 | Decarlo |
| 10,668,353 | B2 | 6/2020 | Mettler May |
| 2005/0153785 | A1* | 7/2005 | Sun ................ A63B 69/36 473/151 |
| 2014/0266630 | A1* | 9/2014 | Beckman ............ G06Q 10/08 340/10.5 |
| 2015/0100245 | A1 | 4/2015 | Huang |
| 2016/0144260 | A1 | 5/2016 | Cohen |
| 2016/0322078 | A1* | 11/2016 | Bose ............. A63B 24/0003 |
| 2017/0318360 | A1* | 11/2017 | Tran ................ H04Q 9/00 |
| 2019/0009133 | A1* | 1/2019 | Mettler May ........ G09B 19/003 |
| 2020/0184846 | A1* | 6/2020 | Zhang ................ A61B 5/1116 |

FOREIGN PATENT DOCUMENTS

| | | |
|---|---|---|
| CN | 104486591 A | 4/2015 |
| CN | 106621261 A | 5/2017 |
| CN | 110227243 A | 9/2019 |
| WO | 2019202474 A1 | 10/2019 |

OTHER PUBLICATIONS

"An optimized IT subsystem health scoring method through combination of Time series model and traditional Machine Learning model", An IP.com Prior Art Database Technical Disclosure, Disclosed Anonymously, IP.com No. PCOM000260282D, IP.com Electronic Publication Date: Nov. 9, 2019, 6 pages.

"Cognitive learning assistance", An IP.com Prior Art Database Technical Disclosure, Disclosed Anonymously, IP.com No. IPCOM000256388D, IP.com Electronic Publication Date: Nov. 28, 2018, 9 pages.

"Reinforcement Learning as a Basis for Optimization of Operating Systems", An IP.com Prior Art Database Technical Disclosure, Disclosed Anonymously, IP.com No. IPCOM000256512D, IP.com Electronic Publication Date: Dec. 5, 2018, 9 pages.

"Sports Ball Degradation Time Computation Using Audio-Visual Analysis", An IP.com Prior Art Database Technical Disclosure, Disclosed Anonymously, IP.com No. IPCOM000262451D, IP.com Electronic Publication Date: Jun. 2, 2020, 5 pages.

Blank, et al., "Ball Speed and Spin Estimation in Table Tennis using a Racket-mounted Inertial Sensor", ISWC '17, Sep. 11-15, 2017, 8 pages.

Gu, et al., "Effects of table tennis multi-ball training on dynamic posture control", PeerJ 6:e6262, Jan. 16, 2019, 19 pages, <https://peerj.com/articles/6262/>.

Mahjourian, et al., "Hierarchical Policy Design for Sample-Efficient Learning of Robot Table Tennis Through Self-Play", arXiv:1811. 12927v2, Feb. 17, 2019, 100 pages.

Vinyes Mora, Silvia, "Computer Vision and Machine Learning for In-Play Tennis Analysis: Framework, Algorithms and Implementation", Doctoral Thesis, Imperial College London, Oct. 2017, 235 pages.

Xie, et al., "Speed and Spin of 40MM Table Tennis Ball and the Effects on Elite Players", ISBS 2002, pp. 623-626.

Ran, et al., "Machine Learning Augmented Loop Drive Training", U.S. Appl. No. 17/038,535, filed Sep. 30, 2020.

Ran, et al., "Capturing and Quantifying Loop Drive Ball Metrics", U.S. Appl. No. 17/038,594, filed Sep. 30, 2020.

List of IBM Patents or Patent Applications Treated as Related. Filed Herewith. 2 pages.

* cited by examiner

CAPTURING AND QUANTIFYING BODY POSTURES

BACKGROUND

The present invention relates generally to the field of computer vision techniques, and more particularly to leveraging computer vision techniques on human body mechanics, such as in table tennis activities.

Computer vision is an interdisciplinary field which grapples with how computers can be granted the ability to gain high-level understanding from digital images or videos. From an engineering perspective, it seeks to automate tasks that the human visual system can do. Computer vision related to the automatic extraction, analysis and understanding of useful information from a single image or a sequence of images such as an animation or video feed. It involves developing a theoretical and algorithmic basis to achieve automatic visual understanding.

Table tennis, also known as ping-pong and whiff-whaff, is a sport where two or four players hit a lightweight ball, also known as the ping-pong ball, back and forth across a table using small rackets, with one to two players on opposing teams positioned on each side of the table. The game takes place on a hard table surface divided by a net. With an exception for the initial serve, the rules are generally as follows: players must allow a ball played toward them to bounce at least once on their side of the table and must return it so that it bounces on the opposite side at least one time. Points are scored when a player fails to return the ball within the rules. Play is fast and requires quick reactions from the players. Spinning the ball alters the trajectory of the ball and limits an opponent's options, giving the player hitting the ball a great advantage, with topspin and downspin corresponding to forward and backward rotation of the table tennis ball relative to the direction of travel for the table tennis ball. Topspin and downspin alter the trajectory of the ball through a phenomenon known as the Magnus effect. The Magnus effect describes a phenomenon where an object travelling through a volume of gas or fluid is deflected in a manner not present when the object is not spinning, and is explained by the difference in pressure of the volume on opposite sides of the spinning object, with rotational speed of the object affecting the extent of the Magnus effect. The "loop", or "loop drive" is a stroke that generates a lot of topspin (with either the forehand or backhand). Loop varieties include slower, 'spinnier' loops and faster but 'not-as-spinny' loops. The loop style is the most popular playing style in contemporary table tennis with a strategy heavily reliant on the loop drive stroke.

SUMMARY

According to an aspect of the present invention, there is a method, computer program product and/or system that performs the following operations (not necessarily in the following order): (i) receiving a table tennis video recording data set, with the table tennis video recording data set including a video recording observing a table tennis player and their body as the table tennis player performs a sequence of motions leading up to and inclusive of follow-through motions after hitting a table tennis ball with a table tennis racket; (ii) determining, automatically, at least two segments of video recordings from the table tennis video recording data set, including a first segment corresponding to motions leading up to hitting the table tennis ball with the table tennis racket, and a second segment corresponding to hitting the table tennis ball with the table tennis racket and subsequent follow-through motions; and (iii) determining, automatically, for the first segment, a first set of data points corresponding to quantitative values for changes in body posture of the player as they perform the sequence of motions leading up to hitting the table tennis ball with the table tennis racket.

DETAILED DESCRIPTION

Figure 1:
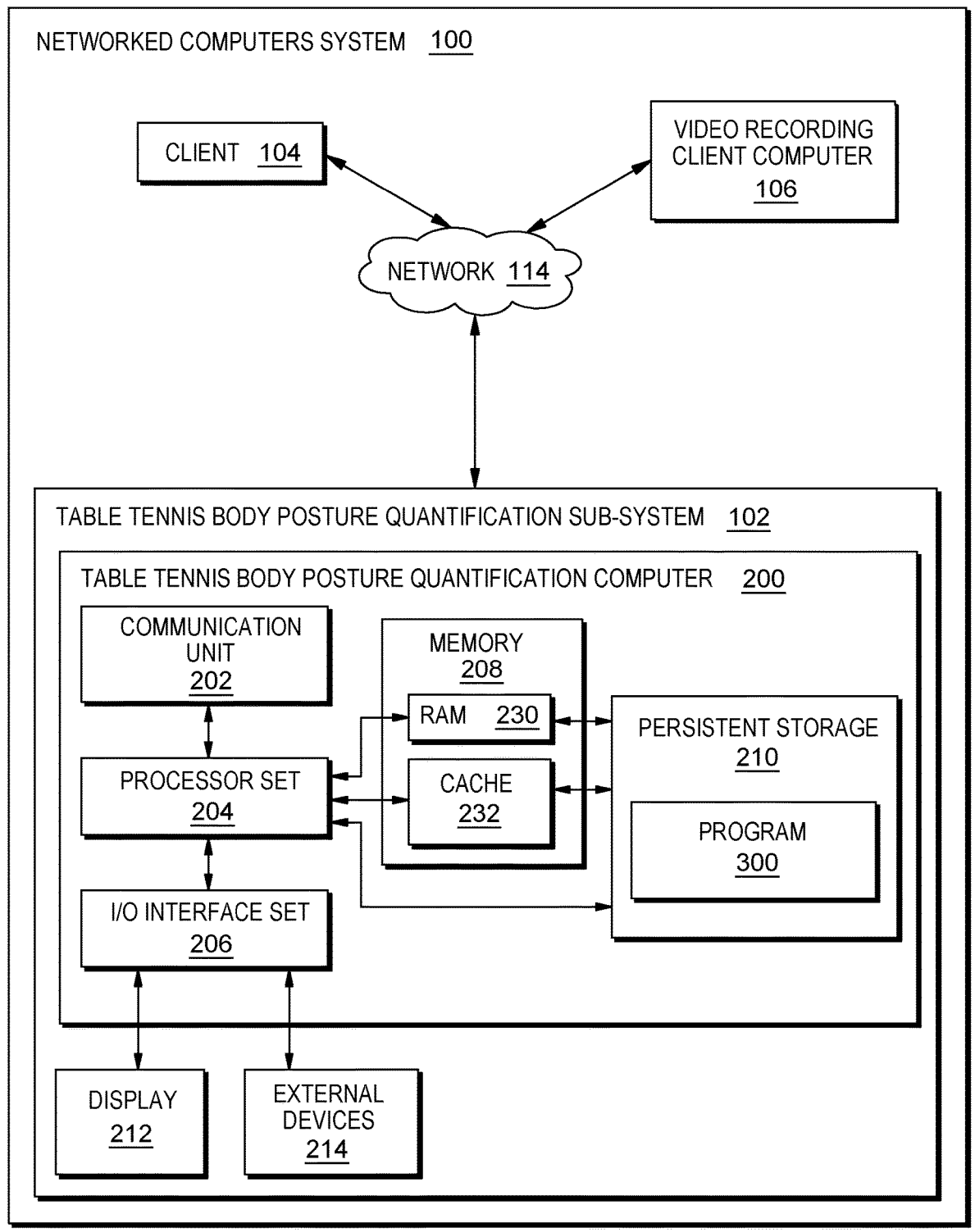
FIG. 1 is a block diagram view of a first embodiment of a system according to the present invention.

Some embodiments of the present invention are directed to techniques for quantifying body postures of a table tennis player employing a loop drive technique to strike a table tennis ball. A video recording of a table tennis player striking a table tennis ball with a loop drive technique is received and divided, using image processing techniques, into two segments: the first concerning player body postures before the ball is hit, and the second concerning body postures from the moment of impact between the ball and racket and the subsequent follow-through body postures. Then, image processing techniques are again leveraged to isolate and quantify specific body postures contributing to a loop drive technique in a given segment.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium, also referred to as machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: table tennis body posture quantification subsystem 102 (sometimes herein referred to, more simply, as subsystem 102); client subsystem 104; video recording client computer 106; and communication network 114. Server subsystem 102 includes: table tennis body posture quantification computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with table tennis body posture quantification computer 200. For example, I/O interface set 206 provides a connection to external device 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

Video recording client computer 106 can be any computer device capable of recording, storing, and processing video recordings of physical environments and objects therein. For example, a computer similar to client 104 augmented with a video recording module for capturing video recordings.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
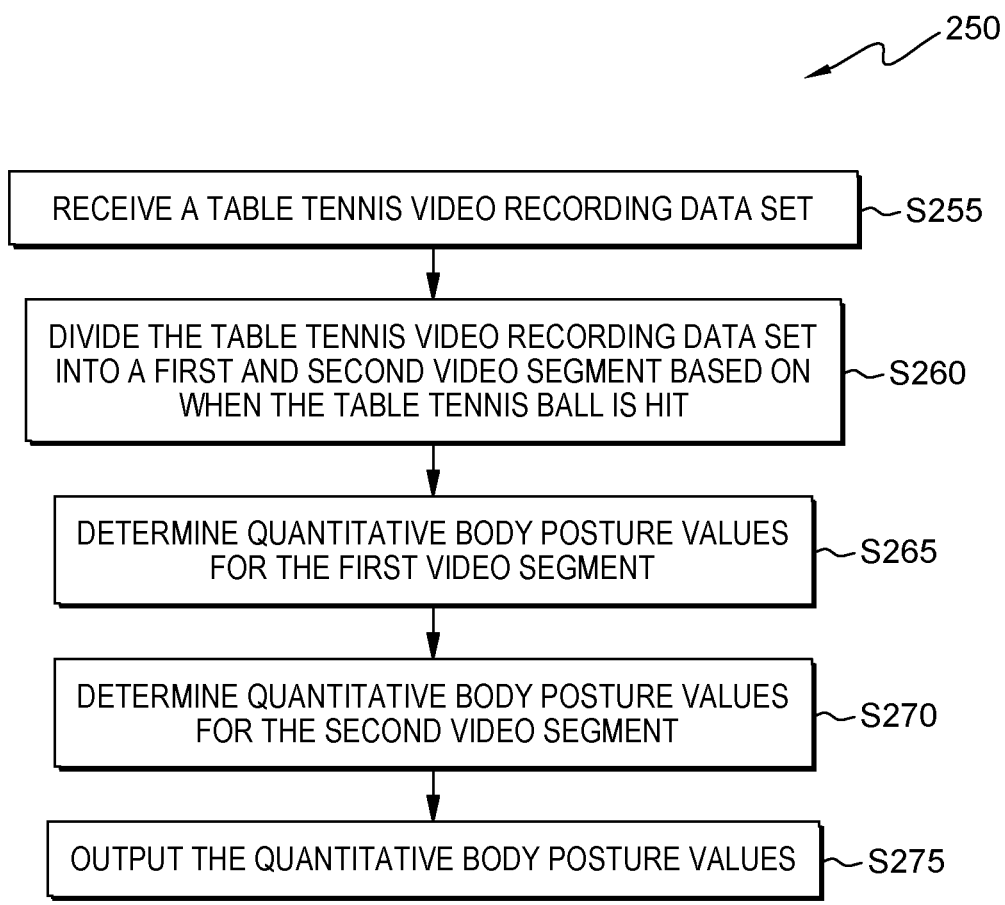
FIG. 2 is a flowchart showing a first embodiment method performed, at least in part, by the first embodiment system.
Figure 3:
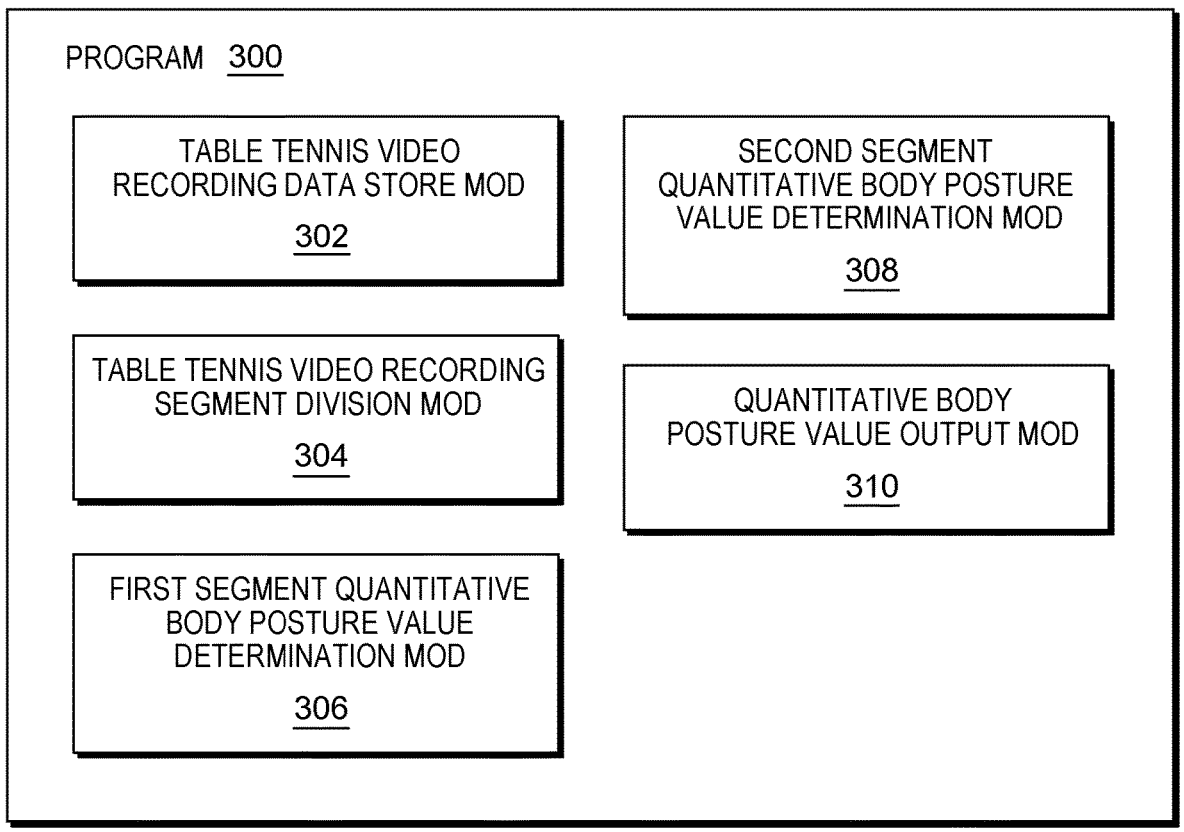
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where table tennis video recording data store module ("mod") 302 receives a table tennis video recording data set. In this simplified embodiment, the table tennis video recording data set includes a video recording observing a table tennis player (also referred to as "the player") striking a table tennis ball (also referred to as "the ball") with a table tennis racket (also referred to as "the racket") after the ball bounces once off of the same side of a table tennis table (also referred to as "the table") as the player is standing proximate to. Throughout the video recording, the player is completely in view while the player proceeds through a sequence of motions to perform a loop drive technique with the racket in their right hand. The loop drive technique includes combining several different body postures to impart power and topspin to the ball, including flexion and extension in the player's knees, extension and flexion in the elbow of the right arm of the player, extending the right arm behind the player in a wind up motion and bringing it forward across the player's chest, rotation at the waist to rotate the upper body away from and then towards the ball, and wrist manipulations of the racket, among others. The video recording includes all of the motions of the body of the player leading up to and inclusive of follow-through motions after hitting the ball with the racket. Follow-through motions include motions affecting the ball with the racket subsequent to the moment of impact between the racket and the ball before the ball and the racket cease physical contact.

Processing proceeds to operation S260, where table tennis video recording segment division mod 304 divides the table tennis video recording data set into a first and second video segment based on when the table tennis ball is hit. In this simplified embodiment, a computer vision based image processing and pattern recognition technique is applied to the table tennis video recording segment to determine when the racket hits the ball, which is then used as a boundary to define the end of the first segment and the beginning of the second segment. The beginning of the first segment is the beginning of the video recording included in the table tennis video recording data set and the end of the second segment is the end of the video recording included in the table tennis video recording data set. In some alternative embodiments, the beginning of the first segment is determined using on a computer vision based image processing and pattern recognition technique to determine when the ball has crossed over a midline of the table towards an opposing player's designated side of the table. In some alternative embodiments, the end of the second segment is determined using on a computer vision based image processing and pattern recognition technique to determine when the racket is no longer in contact with the ball, and therefore unable to further affect the ball.

Processing proceeds to operation S265, where first segment quantitative body posture value determination mod 306 determines quantitative body posture values for the first video segment. In this simplified embodiment, the computer vision based image processing and pattern recognition technique is further applied to the first segment to quantify specific body posture data points that relate to the loop drive technique. In this simplified embodiment, first segment quantitative body posture value determination mod 306 determines a quantitative value corresponding to how many degrees of rotation occurs in the player's waist between a maximum rotation away from the ball to "wind up a swing" until hitting the ball with the racket. For example, when the player rotates their torso from their waist away from the ball, and then begins rotating back towards the ball, the computer vision based image processing and pattern recognition technique recognizes the change in direction of rotation from away to towards the ball as defining the beginning for rotation of the waist in this motion, and similarly recognizes the beginning of physical contact between the racket and the ball as the end of rotation. The difference between beginning and end is used to determine the quantitative value corresponding to how many degrees of rotation occurs in the player's waist between a maximum rotation away from the ball to "wind up a swing" until hitting the ball with the racket. In this simplified embodiment, first segment quantitative body posture value determination mod 306 determines that this quantitative value is 135°, corresponding to the amount of rotation that occurs at the players waist throughout the player beginning the loop drive swing until hitting the ball with the racket. This may also be referred to as an angle of total rotation, referring to the maximum rotation that occurs at the waist from a maximum wind-up position to the point in time where the racket contacts the ball.

In some alternative embodiments, the first segment quantitative body posture value determination mod 306 determines quantitative body posture values for at least some of the following additional body posture values including: (i) the height of the player's shoulders from the ground when bending the knees; (ii) an angle value corresponding to an angle formed between the player's upper and lower legs when bending at their knees; and (iii) the racket's movement displacement when waiving the racket prior to hitting the ball. In yet other alternative embodiments, the first segment quantitative body posture value determination mod 306 determines quantitative body posture values for the maximum difference in height between the player's shoulders and the ground as flexion and extension occurs in the player's knees throughout the sequence of motions.

Processing proceeds to operation S270, where second segment quantitative body posture value determination mod 308 determines quantitative body posture values for the second video segment. In this simplified embodiment, the computer vision based image processing and pattern recognition technique is further applied to the second segment to quantify specific body posture data points that relate to the loop drive technique. In this simplified embodiment, second segment quantitative body posture value determination mod 308 determines a quantitative value corresponding to how many degrees of rotation occurs during flexion at the player's elbow in their right arm when hitting the ball with the racket, beginning at the time when physical contact begins between the racket and the ball and ending when the physical contact ceases between the racket and the ball. For example, when physical contact between the racket and the ball begins, the player's right elbow is bent at an angle of 80° from maximum extension at the elbow, where 0° is defined as maximum extension of the elbow. When physical contact between the racket and ball ceases, the player's right elbow is bent at 135°. The computer vision based image processing and pattern recognition technique determines both of these values based on the second video segment, which second segment quantitative body posture value determination mod 308 uses to determine a quantitative body posture value of the difference, 55°, as how much the player's right elbow rotates during flexion within the motions of hitting the ball with the racket while the racket and the ball are in physical contact.

In some alternative embodiments, the second segment quantitative body posture value determination mod 308 determines quantitative body posture values for at least some of the following additional body posture values when the racket and the ball are in physical contact, including: (i) the angle between the upper arm of the player and their torso corresponding to the arm holding the racket; (ii) the height of the elbow of the player from the table corresponding to the arm holding the racket; (iii) the height of racket from the table; (iv) the angle between racket and the ball; (v) the position of the ball on the surface of the racket when the racket is in contact with the ball, such as with a pair of coordinates denoting where on the surface of the racket physical contact began between the ball and the racket; and (vi) the movement speed/acceleration/velocity of the racket, such as average velocity of racket from beginning to end of physical contact with the ball.

Figure 4:
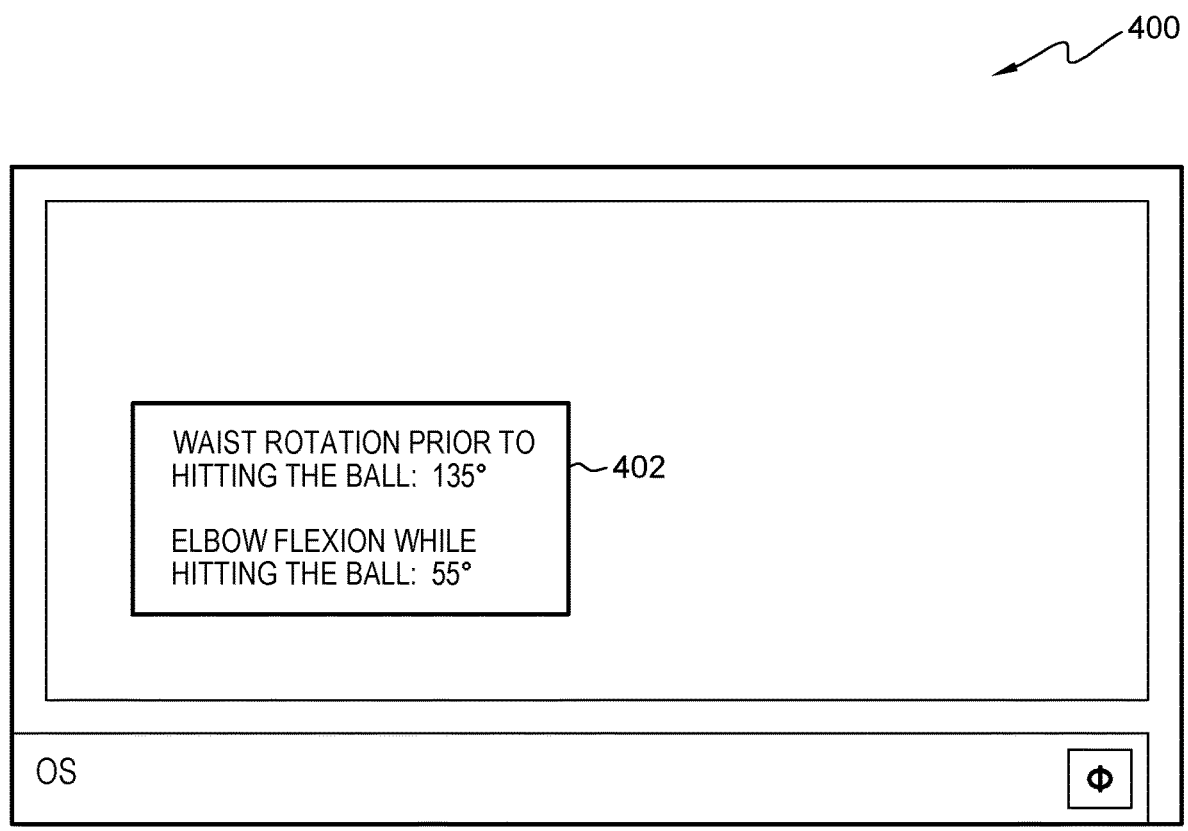
FIG. 4 is a screenshot view generated by the first embodiment system.

Processing proceeds to operation S275, where quantitative body posture value output mod outputs the quantitative body posture values. In this simplified embodiment, the quantitative body posture value output mod outputs the quantitative body posture values on a display device connected to client 104, as shown in window 402 of screenshot 400 of FIG. 4. In some alternative embodiments, the quantitative body posture values are outputted audibly through an audio speaker device connected to client 104 using a text-to-speech technique. In yet another alternative embodiment, the quantitative body posture values are outputted as outlines, labeled with their quantitative values, superimposed over the player in the video recording of the player striking the ball with the racket after the ball bounces once off of the same side of the table as the player is standing proximate to.

III. Further Comments and/or Embodiments

Some embodiments of the present invention recognize the following facts, potential problems and/or potential areas for improvement with respect to the current state of the art: (i) loop drive is one of the most key and popular techniques in table tennis, and occupies the majority of time players devote during their training and practice; (ii) correct body postures are key to achieving high quality of ball returns using loop drive, thus the capturing and acquisition of related accurate body postures is essential to improving player's loop drive training quality; (iii) while solutions exist for devices capturing and acquisition of body postures, or devices used as training harness, etc., there are mainly 2 problems for them; (iv) first, there is not a comprehensive and synthetic feature summary on all the related body postures that could impact the quality of loop drive training; (v) loop drive training body postures involve lots of coordination activities between various body parts including legs, waist, shoulder, arms, elbow, wrist, etc.; (vi) and second, there are no accurate and quantitative acquisition technologies to capture the body postures that are specifically related to loop drive training activities; (vii) notice that even a table tennis coach cannot give detailed and very accurate and measurable points for the body postures; and (viii) for example, an angle value in degrees that the player bent their wrist during loop drive hitting, or an angle value in degrees between the player's upper arm and forearm when they hit the ball, etc.

Some embodiments of the present invention may include one, or more, of the following operations, features, characteristics and/or advantages: (i) a comprehensive set of features of body postures that can impact the quality of table-tennis loop drive ball; (ii) leverage video & image processing, pattern recognition, and 3-D modeling techniques to collect quantitative data for body postures when a player performs table-tennis loop drive training; (iii) this quantitative data can be used as an accurate reference for coaches and players to correct and improve a players' body postures during loop drive training, and finally assist the player to master the loop drive skills; (iv) use a comprehensive set of features of body postures (related to arms, wrist, waist, legs, etc.) that can directly impact the quality of table tennis loop drive ball return; (v) a quantitative capturing system for body postures during loop drive training; (vi) which can be used as an accurate reference for coaches and players to improve and correct the body postures during loop drive; (vii) and make players master the correct loop drive skills quickly; (viii) first, a video-based 3-D Modeling (i.e. computer vision) technique and video acquisition technique are selected, as well as a processing and pattern recognition technique that can be used to calculate body parts' placement, angles, height, speed, etc. during loop drive training; (ix) next, customize the selected image processing and pattern recognition techniques to divide one loop drive instance into two periods: (a) process of waving the racket prior to hitting the loop drive ball, and (b) process of hitting the loop drive ball; (x) next, leverage the previously selected image processing and pattern recognition techniques to capture the body postures during process of waving the racket, and before beating loop drive, and determine the corresponding value of: (a) the angle of turning the player's waist, (b) the height of the shoulders from the ground, (c) the angle between thigh and calf, and (d) the movement displacement of the racket; (xi) next, leverage the previously selected image processing and pattern recognition techniques to capture the body postures during process of hitting the loop-drive ball, and calculate the corresponding value of: (a) the angle between the player's upper arm and forearm, (b) the angle between the upper arm of the player and their torso, and (c) the height of the elbow of the player from the table; (xii) also leverage the previously selected image processing and pattern recognition techniques to capture the posture of the racket when hitting the loop-drive ball, and calculate the corresponding value of: (a) the height of racket from the table, (b) the angle between racket and the ball, (c) the position of the ball on the surface of the racket when the racket is in contact with the ball, and (d) the movement speed/acceleration of the racket.

Some embodiments of the present invention may include one, or more, of the following operations, features, characteristics and/or advantages: (i) a list of a player's body postures during the process of waving the racket and before beating loop used in the machine learning analysis includes: (a) the angle of turning of their waist, (b) the height of the shoulders from the ground when bending the knees, (c) the angle between thigh and calf when bending the knees, and (d) the racket's movement displacement when waiving the racket prior to hitting the ball; and (ii) a list of a player's body postures during the process of hitting the loop drive ball used in the analysis includes: (a) the angle between upper arm and forearm, (b) the angle between upper arm and armpit, (c) the height of the elbow from the table, (d) the posture of the racket (height of the racket from the table, angle between racket surface and ball, and position of the ball on the surface of the racket when contact occurs), and (e) the movement speed/acceleration of the racket.

According to an aspect of the present invention, there is a method, computer program product and/or system for a body postures and acquisition and quantification system in table tennis loop drive training that performs the following operations (not necessarily in the following order): (i) set up a comprehensive set of features of a player's body postures that can impact the quality of table-tennis loop drive; (ii) leverage video and image processing, pattern recognition, and 3-D modeling methods to collect quantitative data about the body postures of players when the players do table-tennis loop drive training; and (iii) this quantitative data can be used as a reference for coaches and players to correct and improve the players' body posture during loop drive training.

Some embodiments of the present invention may include one, or more, of the following operations, features, characteristics and/or advantages: (i) focus on bringing up the specific quantitative and static movement data at a specific moment that are related to loop drive training (which is essential and one of the most important and common training activities) in table-tennis training, and how to capture this specific quantitative data; (ii) this quantitative static movement data include: (a) the degree of angle among upper arm, (a) upper arm and armpit, (c) the degree of angle of turning waist, (d) the height of the shoulders from the ground, (e) the degree of angle between thigh and calf, and (f) the posture of the racket, etc.; (iii) focus on loop drive action quantization and capturing during table-tennis training, which does not only includes a hitting action, but also including player's body postures during process of waving the racket, including: (a) the degree of angle of turning waist, (b) the height of the shoulders from the ground when bending the knees, (c) the degree of angle between thigh and calf when bending the knees, (e) the racket's movement displacement when waving the racket until hitting the ball, and (f) and before hitting the ball; (iv) comprehensive and specific quantitative data on body postures and movements during loop-drive training; (v) focus on bringing up specific quantitative features related to body postures/movements during table-tennis' loop drive training, and methods on how to capture those quantitative data; (vi) this unique table-tennis loop drive related quantitative data includes: (a) the degree of angle of turning waist, (b) the height of the shoulders from the ground when bending the knees, (c) the degree of angle between thigh and calf when bending the knees, and (d) the racket's movement displacement when waving the racket until hitting the ball, etc.; (vi) focus on bringing up unique, synthetic and quantitative features related to body postures/movements in table-tennis loop drive training, and how to capture that data; and (vii) the data includes: (a) the degree of angle of turning waist, (b) the height of the shoulders from the ground when bending the knees, (c) the degree of angle between thigh and calf when bending the knees, and (e) the racket's movement displacement when waving the racket until hitting the ball, etc.

Figure 5:
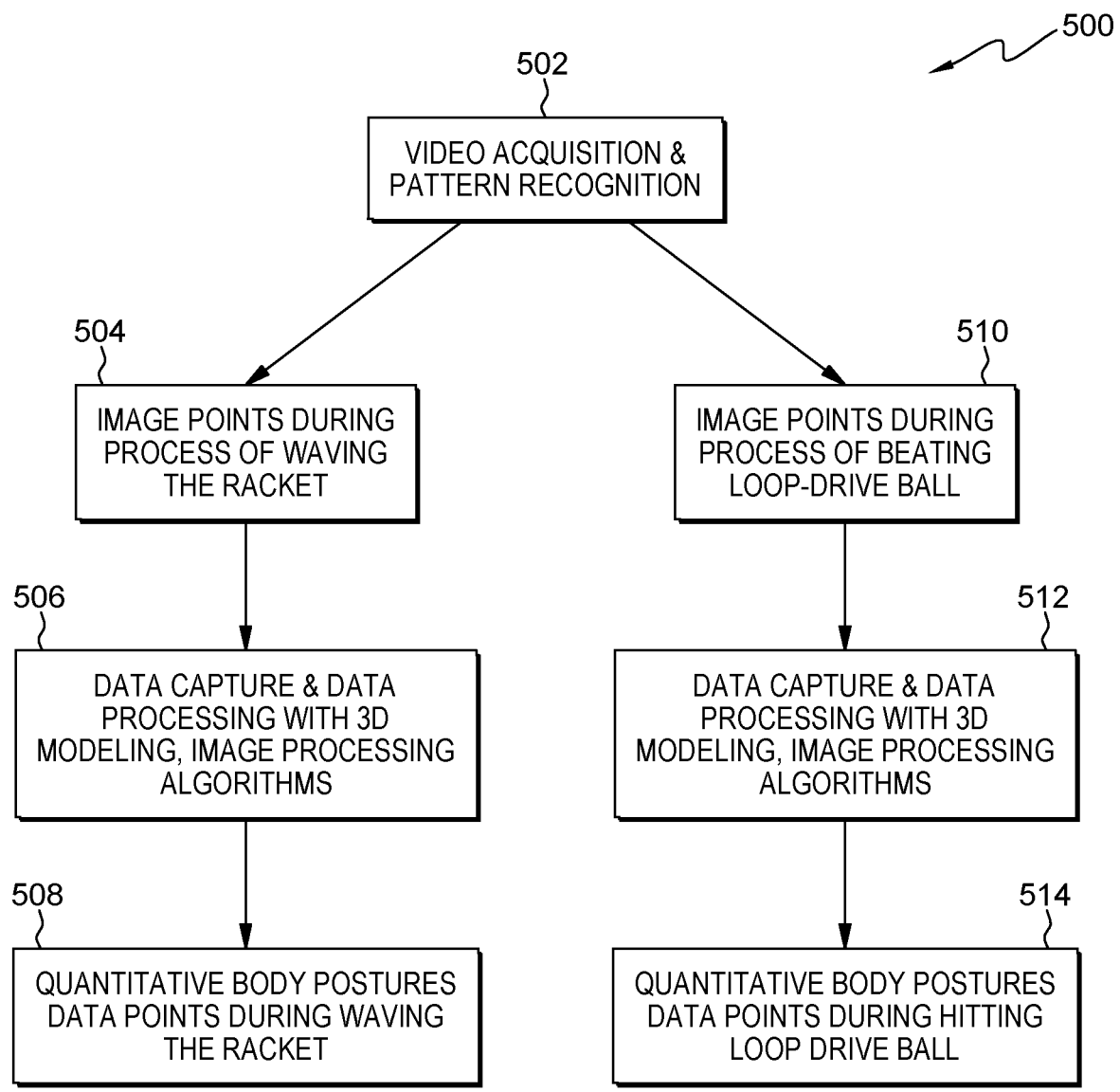
FIG. 5 is a flowchart diagram showing a second embodiment method.

Referring to FIG. 5, flowchart 500 shows a second embodiment method according to the present invention and includes the following operations: (i) operation 502; (ii) operation 504; (iii) operation 506; (iv) operation 508; (v) operation 510; and (vi) operation 512.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

What is claimed is:

1. A computer-implemented method (CIM) comprising:
receiving a table tennis video recording data set, with the table tennis video recording data set including a video recording observing a table tennis player and their body as the table tennis player performs a sequence of motions leading up to and inclusive of follow-through motions after hitting a table tennis ball with a table tennis racket;
determining, automatically, at least two segments of video recordings from the table tennis video recording data set, including a first segment corresponding to motions leading up to hitting the table tennis ball with the table tennis racket, and a second segment corresponding to hitting the table tennis ball with the table tennis racket and subsequent follow-through motions;
determining, automatically, for the first segment, a first set of data points corresponding to quantitative values for changes in body posture of the player as they perform the sequence of motions leading up to hitting the table tennis ball with the table tennis racket; and
the first set of data points includes at least: (i) an angle value corresponding to total rotation as the player rotates at their waist, (ii) an angle value corresponding to an angle formed by a lower leg and upper leg of the table tennis player as the table tennis player bends their legs at their respective knees at maximum flexion, (iii) a height value corresponding to the difference between a maximum and minimum distance between a ground surface and shoulders of the table tennis player as they bend and extend their legs, and (iv) a distance value corresponding to a total distance travelled by the table tennis racket beginning with the table tennis player swinging the table tennis racket towards the table tennis ball and ending immediately upon physical contact between the table tennis racket and the table tennis ball.

2. A computer-implemented method (CIM) comprising:

receiving a table tennis video recording data set, with the table tennis video recording data set including a video recording observing a table tennis player and their body as the table tennis player performs a sequence of motions leading up to and inclusive of follow-through motions after hitting a table tennis ball with a table tennis racket;

determining, automatically, at least two segments of video recordings from the table tennis video recording data set, including a first segment corresponding to motions leading up to hitting the table tennis ball with the table tennis racket, and a second segment corresponding to hitting the table tennis ball with the table tennis racket and subsequent follow-through motions;

determining, automatically, for the first segment, a first set of data points corresponding to quantitative values for changes in body posture of the player as they perform the sequence of motions leading up to hitting the table tennis ball with the table tennis racket;

determining, automatically, for the second segment, a second set of data points corresponding to quantitative values for changes in body posture of the player as the player hits the table tennis ball with the table tennis racket and subsequent follow-through motions; and the second set of data points includes at least: (i) an angle value corresponding to an angle formed between a forearm and upper arm of the table tennis player where the forearm and upper arm correspond to an arm holding the table tennis racket, (ii) an angle between the upper arm and a torso of the table tennis player, (iii) a height value corresponding to a distance between a table tennis table and an elbow of the table tennis player where the elbow corresponds to the arm holding the table tennis racket, (iv) a velocity value corresponding to average velocity of the table tennis racket from beginning to end of physical contact with the table tennis ball, (v) a height value corresponding to a distance between the table tennis table and the table tennis racket upon beginning contact between the table tennis ball and the table tennis racket, and (vi) a pair of coordinates corresponding to a location upon a striking surface of the table tennis racket where contact between the table tennis racket and table tennis ball occurred.

3. A computer program product (CPP) comprising:

a machine readable storage device; and computer code stored on the machine readable storage device, with the computer code including instructions for causing a processor(s) set to perform operations including the following:

receiving a table tennis video recording data set, with the table tennis video recording data set including a video recording observing a table tennis player and their body as the table tennis player performs a sequence of motions leading up to and inclusive of follow-through motions after hitting a table tennis ball with a table tennis racket, determining, automatically, at least two segments of video recordings from the table tennis video recording data set, including a first segment corresponding to motions leading up to hitting the table tennis ball with the table tennis racket, and a second segment corresponding to hitting the table tennis ball with the table tennis racket and subsequent follow-through motions, determining, automatically, for the first segment, a first set of data points corresponding to quantitative values for changes in body posture of the player as they perform the sequence of motions leading up to hitting the table tennis ball with the table tennis racket, and the first set of data points includes at least: (i) an angle value corresponding to total rotation as the player rotates at their waist, (ii) an angle value corresponding to an angle formed by a lower leg and upper leg of the table tennis player as the table tennis player bends their legs at their respective knees at maximum flexion, (iii) a height value corresponding to the difference between a maximum and minimum distance between a ground surface and shoulders of the table tennis player as they bend and extend their legs, and (iv) a distance value corresponding to a total distance travelled by the table tennis racket beginning with the table tennis player swinging the table tennis racket towards the table tennis ball and ending immediately upon physical contact between the table tennis racket and the table tennis ball.

* * * * *